(12) United States Patent
Hayden

(10) Patent No.: US 6,238,641 B1
(45) Date of Patent: May 29, 2001

(54) REDUCED CATALYTIC CARBONACEOUS CHAR AND PROCESS FOR REDUCING THE INHERENT CARBON CATALYTIC REACTIVITY OF CARBONACEOUS CHARS

(75) Inventor: Richard A. Hayden, Pittsburgh, PA (US)

(73) Assignee: Calgon Carbon Corporation, Pgh, PA (US)

( * ) Notice: Subject to any disclaimer, the term of this patent is extended or adjusted under 35 U.S.C. 154(b) by 0 days.

(21) Appl. No.: 09/078,919

(22) Filed: May 14, 1998

(51) Int. Cl.$^7$ .................................................. C01B 31/08
(52) U.S. Cl. ............................................ 423/460; 502/426
(58) Field of Search ............................... 423/460; 502/27, 502/34, 426

(56) References Cited

U.S. PATENT DOCUMENTS 4,199,872 * 4/1980 Bischoft ................................. 201/12
4,495,165 * 1/1985 Gurza ................................... 423/313

* cited by examiner

*Primary Examiner*—Stuart Hendrickson
(74) *Attorney, Agent, or Firm*—Cohen & Grigsby, P.C.

(57) ABSTRACT

A process is provided for reducing the inherent carbon catalytic reactivity of carbonaceous chars. In this process a carbonaceous char is contacted first with a Bronsted acid. The acid-treated char is then heated to temperatures greater than 750° C. By this method the inherent catalytic reactivity of the carbon in the char is reduced effectively and largely irreversibly.

1 Claim, No Drawings

REDUCED CATALYTIC CARBONACEOUS CHAR AND PROCESS FOR REDUCING THE INHERENT CARBON CATALYTIC REACTIVITY OF CARBONACEOUS CHARS

FIELD OF THE INVENTION

The present invention relates to a carbonaceous char and a process for reducing the inherent carbon catalytic reactivity of carbonaceous chars.

BACKGROUND OF THE INVENTION

Carbonaceous chars such as activated carbons, especially those produced at high temperatures (i.e., above 700° C.), often possess catalytic properties which may interfere with their use in certain applications. The origins of this catalytic activity can usually be attributed to two principal factors: (1) the inorganic non-carbon ash constituents of the char, e.g. iron, potassium, and calcium, and (2) the inherent catalytic properties of the carbon itself. If the char is used for the physical adsorption, removal, and/or recovery of substances from fluid streams, the presence of catalytic reactivity in the char may lead to an unwanted chemical conversion of the adsorbates into materials that contaminate the final process stream or interfere with the physical adsorption process. Moreover, the reactions which lead to catalytic chemical conversion are often highly exothermic, increasing the likelihood of ignition of the char itself.

Examples of processes in which the catalytic reactivity of the char is a liability include the purification of reactive or oxidizable products such as hydrogen peroxide and organic glycols, and the adsorption, recovery, and re-use of reactive or oxidizable solvents such as acetone and methyl ethyl ketone. In these types of applications, the primary adsorbate or component of the stream is itself a material which can become reactive if catalyzed by the carbon under certain conditions. In other applications it may be desirable to preserve a reactive constituent, e.g. hydrogen peroxide, such that it is available for reaction with species other than the carbon itself Less obvious is the need for a non-catalytic, adsorptive carbon for applications in which the potentially reactive component is an interference, constituting only a small part of the overall adsorbate loading. For example, in streams containing small concentrations of an oxidizable material such as hydrogen sulfide and much higher concentrations of an adsorbable, recoverable organic, it is possible that the oxidation of the hydrogen sulfide, which is only weakly physically adsorbed per se, can cause a build-up over time of highly adsorbable and polar reaction products, such as sulfuric acid, which can greatly interfere with the adsorption of the organic components of the stream. If the inherently reactive carbon catalytic sites can be deactivated, maximum use can be made of the physical adsorption properties of the carbon for the removal and recovery of the organic stream components.

Prior art methods to reduce the catalytic reactivity of carbonacous chars have been directed almost exclusively on the removal or deactivation of catalytically-active ash constituents which may be present in the char. For example, it is known to remove acid-soluble ash constituents by acid-washing of the char. After treatment, the char is invariably rinsed with water and/or an aqueous solution of a base to remove and/or neutralize the acid. Hydrofluoric acid solution, an extremely hazardous material, has been found to be particularly effective for removing such ash components. Ash reductions exceeding an order of magnitude are usually achievable by these methods. Other ash removal processes treat the char first with caustic solution to remove caustic-soluble components, followed by the aforementioned acid extraction treatment to remove the remaining acid-soluble components. In other methods, the ash components are treated with agents such as silanes to reduce their catalytic reactivity without removing them from the carbon surface. In all of these prior art methods, however, little regard has been given to the inherent reactivity of the carbon itself, which alone may be sufficient to interfere with the intended function of the char.

Where the reactivity of the carbon has been considered, no methods have been identified or reported which can deactivate the carbon effectively and irreversibly. For example, it has been observed that oxygen can chemisorb to the carbon surface and cause the carbon to become less reactive. However, after use, and upon high-temperature thermal treatment of the char to remove other adsorbed materials, it is found that oxygen is also lost from the carbon. Upon removal of the oxygen, the inherent catalytic reactivity of the carbon once again becomes manifest, requiring additional post-treatment of the thermally-treated char to deactivate the carbon prior to re-use. Therefore, the oxygen appears to have merely masked, and not destroyed, the catalytic activity of the carbon.

Accordingly, it is the object of the present invention to provide a process which reduces the inherent carbon catalytic activity of carbonaceous chars for use in those applications wherein the inherent catalytic activity of the carbon is a concern. It is further the object of the present invention to provide a process in which the required deactivation of the carbon can be accomplished in a convenient and economical manner, and be readily integrated into contemporary methods for the production of carbonaceous chars, in particular the production of activated carbons. Additionally, it is the object of the present invention to provide a method for the deactivation of the carbon in such a way that the deactivation is largely irreversible upon high-temperature thermal treatment. It is also an object of the invention to provide a carbonaceous char having substantially reduced inherent catalytic activity.

SUMMARY OF THE INVENTION

Generally, the present invention comprises a process for reducing the inherent carbon catalytic reactivity of a carbonaceous char such that the achievable deactivation is largely irreversible upon high-temperature thermal treatment of the char. The method of the present invention comprises contacting the char with a non-nitrogen-containing Bronsted acid, preferably a non-oxidizing acid such as hydrochloric acid, at temperatures which are at or below the boiling point of the acid or aqueous acid solution. Thereafter raising the temperature to above 750° C. Nitrogen-containing acids, such as nitric acid, are generally not preferred in the present invention. Treatment by such acids is known to increase the catalytic activity of carbonaceous chars under certain treatment conditions. The amounts of acid used in the present invention are such that the char contains preferably 1–10 millimoles of acid per mole of carbon prior to raising the temperature of the acid-containing carbon to or above 750° C. The acid may also be used to extract and remove any acid-soluble ash constituents present in the char but this is not necessary for applications requiring only the deactivation of the carbon itself. If the char is rinsed with water following acid treatment, the rinse is carried out such that the pH of the rinse water is less than 5, preferably less than 1, to ensure that sufficient acid is present on the char to accomplish the required deactivation of the catalytic carbon sites upon raising the temperature. Upon exposure of the acid-containing char to temperatures greater than or equal to 750° C., the deactivation of the carbon reactivity is largely effected. The heating of the acid-containing carbon is carried out preferably in an inert or oxygen-free atmosphere, while the cooling of the deactivated char to ambient temperatures may be carried out in an oxygen-containing atmosphere to impart additional deactivation properties to the char according to the methods of known prior art. Other prior art methods for deactivating other reactive elements of the char may also be applied to the method of the present invention to impart still other desirable properties to the deactivated char. For example, for chars containing high levels of inorganic ash constituents, the ash components may be removed with base and/or acid after, as well as prior to, application of the method of the present invention.

The method of the present invention may be applied any number of times to the same char to achieve additional levels of deactivation. However, for chars with comparatively low levels of initial inherent carbon reactivity, a single application of the method is generally sufficient to achieve acceptable reductions in carbon reactivity. Other advantages of the present invention will become apparent from a perusal of the following detailed description of presently preferred embodiments of the invention.

PRESENTLY PREFERRED EMBODIMENTS

The following examples illustrate the practice of the invention. In these examples, a peroxide decomposition reaction is used as the primary measure of the reactivity of the carbon. One char chosen for treatment by the method of the present invention is a Centaur carbon. A Centaur carbon is a commercially available activated carbon treated during manufacture to greatly enhance the inherent catalytic activity of the carbon. Using this methodology the relative effects of the deactivation treatment can be followed more conveniently in the laboratory. Commercial practice of the invention, however, will generally involve the deactivation of chars which are not first treated to enhance the inherent catalytic activity of the carbon.

Example 1 is a preferred embodiment of the invention wherein a Centaur HSV activated carbon, deactivated by impregnation with a strong mineral acid according to the method of the present invention, is compared to a control impregnated only with water. In this example it is seen that the present invention provides significant reductions in catalytic activity (higher t-¾ times) without significant changes in the ash content of the char.

Example 2 is an example of a prior art extraction of the Centaur HSV carbon with a strong mineral acid is carried out to remove ash components from the carbon. The carbon is then water-rinsed, or first base-neutralized and then water-rinsed, to remove the acid from the carbon prior to heating to temperatures above 750° C. In this example it is seen that significant reductions in the ash content of the char by the methods of the prior art provide little or no reduction in the catalytic activity of the carbon.

Comparison of the results of Example 2 with those of Example 1 shows that the deactivation of the carbon by the method of the present invention is dependent primarily upon the presence of the acid contacting the carbon as the temperature is increased to above 750° C., and not upon the removal of ash as required by the methods of the prior art.

Example 3 provides a representation of the prior art wherein oxygen is chemisorbed to the carbon surface to provide a measure of deactivation. After heating to temperatures above 750° C., it is seen that the catalytic activity of the char is largely restored.

Comparison of the results of Example 3 with those of Example 1 shows that the deactivation afforded by the present invention is enabled and made largely irreversible by heating to temperatures above 750° C., while in the prior art method the deactivation is largely reversible and is mostly destroyed by heating to temperatures above 750° C.

Example 4 is a preferred embodiment of the invention using Centaur carbon. In this example it is seen that heat-treatment temperatures above about 750° C. are the most efficacious for deactivating the carbon, and that the deactivation is not dependent upon retention of the acid by the carbon. Deactivation is most effective at those temperatures wherein the acid is completely removed.

Example 5 is a preferred embodiment of the invention using BPL carbon. In this example it is seen that any strong Bronsted mineral acid affords a significant measure of deactivation when applied according to the method of the present invention, and that non-oxidizing acids such as HCl and HBr are more efficacious than oxidizing acids such as $H_2SO_4$.

Example 6 is a preferred embodiment of the invention using BCP carbon. Unlike Centaur carbon, BCP carbon is a commercially-available activated carbon which has not been treated during manufacture to enhance the inherent catalytic activity of the carbon.

EXAMPLE 1

A 50.0 gram sample of Centaur HSV carbon, as received, was impregnated with 15 mL of distilled, deionized water. The impregnated carbon was then allowed to stand in a closed container for approximately 2 hours. At the end of this time period, the impregnated carbon was oven-dried at about 150° C. overnight, and subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 4.0 wt % and the t-3/4 time measured 12.1 minutes.

To demonstrate the method of the present invention, a replicate 50.0 gram sample of Centaur HSV carbon, as received, was impregnated with 15 mL of 1:1 hydrochloric acid solution (approximately 6 N). The impregnated carbon was then allowed to stand in a closed container for approximately 2 hours. At the end of this time period, the impregnated carbon was oven-dried at about 150° C. overnight, and subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 3.7 wt % and the t-¾ time measured 72.6 minutes.

EXAMPLE 2

A 63.8 gram sample of the Centaur HSV carbon, as received, used in Example 1 was Soxhlet-extracted for about 24 hours with 1:1 hydrochloric acid solution (approximately 6 N). After extraction, the carbon was transferred to a glass column and rinsed upflow with deionized water at a rate of about 100 mL per minute (about 1 bed volume per minute) for roughly 7 days. At the end of this time period, the carbon was transferred to a beaker and dried in an oven overnight at about 150° C. After oven-drying the carbon was subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 2.8 wt % and the t-¾ time measured 13.7 minutes.

A replicate 63.8 gram sample of the Centaur HSV carbon, as received, was also Soxhlet-extracted for about 24 hours with 1:1 hydrochloric acid solution (approximately 6 N). After extraction, the carbon was transferred to a beaker containing about 100 mL of distilled deionized water and titrated with aqueous sodium hydroxide solution such that the pH of the solution in contact with the carbon, upon standing for about 24 hours, was greater than 5. The base-neutralized carbon was then transferred to a glass column and rinsed upflow with deionized water at a rate of about 100 mL per minute (about 1 bed volume per minute) for roughly 7 days. At the end of this time period, the carbon was transferred to a beaker and dried in an oven overnight at about 150° C. After oven-drying, the carbon was subsequently heated in an inert nitrogen atmosphere for about 20 minutes at 950° C. After cooling to ambient temperature under nitrogen, the carbon was tested for total ash content by Calgon Carbon test method TM-5 (Calgon Carbon Corporation, Pittsburgh, Pa.), and for t-¾ time by the method described in Example 1 of U.S. Pat. No. 5,470,748.

For this carbon sample, the ash content measured 2.7 wt % and the t-¾ time measured 13.2 minutes.

EXAMPLE 3

A 50.0 gram sample of the Centaur HSV carbon, as received, used in Example 1 was heated in a flowing air stream in a rotary kiln for about 30 minutes at approximately 425° C. After this treatment the resultant oxidized carbon was cooled to ambient temperature in air and tested for t-¾ time by the method described in Example 1 of U.S. Pat. No. 5,470,748. For this carbon sample, the t-¾ time measured 40.0 minutes.

Approximately 40 grams of the oxidized carbon was then returned to the rotary kiln and heated in a flowing nitrogen stream for about 30 minutes at approximately 925° C. After this treatment the resultant carbon was cooled to ambient temperature under a nitrogen atmosphere and tested for t-¾ time by the method described in Example 1 of U.S. Pat. No. 5,470,748. For this carbon sample, the t-¾ time measured 14.4 minutes.

EXAMPLE 4

Approximately 60 mL of 1:1 hydrochloric acid (approximately 6N) were added to 140 grams of a granular Centaur carbon that had been previously oven-dried at about 150° C. for about 24 hours. The impregnated carbon was contained in a closed glass jar and allowed to stand for about a week. The uncapped glass jar containing the impregnated carbon was then placed in an oven to dry for about 24 hours at about 150° C. After oven-drying, a representative portion of the resultant acid-treated, oven-dried carbon was tested for chlorine content by Calgon Carbon Test Method RTM-8 (Calgon Carbon Corporation, Pittsburgh, Pa.) and for t-¾ time.

The measurement of the t-¾ time for this sample and for all subsequent samples in this example was accomplished by the method described in Example 1 of U.S. Pat. No. 5,470,748, the sole exception residing in the choice of buffer solution. In the present example the buffer solution comprised 50 mL of a solution having a pH of approximately 12. This solution was prepared by combining equal volumes of a 1 M $K_2HPO_4$ solution and a 1 M $K_3PO_4$ solution.

Additional representative 15 gram portions of the acid-treated, oven-dried Centaur carbon were heated for about 1 hour under nitrogen, one portion each at about 350, 550, 750, 850, 950, and 1050° C. After this heat-treatment, each sample was cooled to ambient temperature under nitrogen, and the chlorine contents and t-¾ times of each of the resultant carbons were measured. These data are compared in Table 1 to the chlorine content and t-¾ time for a 15 gram sample of the virgin Centaur carbon which had been only oven-dried for about 4 hours at about 150° C. and then calcined under nitrogen for about 1 hour at about 950° C., followed by cooling under nitrogen to ambient temperature.

TABLE 1

| SAMPLE | ACID TREATMENT (YES/NO) | HEAT-TREATMENT T (° C.) | Cl (WT %) | t-3/4 TIME (MINUTES) |
|---|---|---|---|---|
| Centaur | no | 950 | 0.05 | 2.6 |
| Centaur | yes | 150 | 1.51 | 7.2 |
| Centaur | yes | 350 | 1.32 | 4.6 |
| Centaur | yes | 550 | 1.12 | 3.3 |
| Centaur | yes | 750 | 0.95 | 3.6 |
| Centaur | yes | 850 | 0.17 | 7.2 |
| Centaur | yes | 950 | 0.11 | 17.3 |
| Centaur | yes | 1050 | 0.03 | 18.3 |

EXAMPLE 5

Six replicate twenty-gram portions of BPL Carbon, a commercially-available bituminous coal-based activated carbon manufactured by Calgon Carbon Corporation (Pittsburgh, Pa.), were oven-dried, as received, in air at about 150° C. for about 24 hours, and then cooled in air to ambient temperature, to remove any residual moisture which the carbon may have adsorbed during storage. To determine the inherent catalytic activity of the BPL carbon as received, one twenty-gram portion of oven-dried carbon was calcined under nitrogen for about 30 minutes at about 950° C. and then cooled to ambient temperatures under nitrogen. The t-¾ time of the material resulting from this treatment was then measured by the method described in Example 1 of U.S. Pat. No. 5,345,768, the sole exception residing in the choice of buffer solution which in the present invention comprised 50 mL of a solution having a pH of approximately 12 and made by combining equal volumes of a 1 M $K_2HPO_4$ solution and a 1 M $K_3PO_4$ solution. When tested in this manner, the inherent t-¾ time of the carbon measured 6 minutes.

The remaining five portions of the oven-dried BPL carbon were deactivated by the method of the present invention in the following manner:

Approximately 12 mL of a 5 N aqueous hydrochloric acid, hydrobromic acid, hydroiodic acid, sulfuric acid, and phosphoric acid solution were impregnated, respectively, onto the five oven-dried carbon portions, which were then allowed to stand for at least 24 hours in closed glass containers at ambient temperatures. Following this treatment, the containers and their contents were directly oven-dried in air at about 150° C. and at atmospheric pressure for about 24 hours, and then cooled to ambient temperature in air. Following this treatment, the oven-dried, acid-treated carbons were calcined under nitrogen for about 30 minutes at about 950° C. and then cooled to ambient temperatures under nitrogen. The t-¾ times of the materials resulting from this treatment were then measured by the method described above. When tested in this manner, the inherent t-¾ times of the deactivated carbons measured 60 minutes for the carbon treated with hydrochloric acid, 159 minutes for the carbon treated with hydrobromic acid, 16 minutes for the carbon treated with hydroiodic acid, 17 minutes for the carbon treated with sulfuric acid, and 40 minutes for the carbon treated with phosphoric acid.

EXAMPLE 6

Two replicate twenty-five gram portions of BCP Carbon, a commercially-available bituminous coal-based activated carbon manufactured by Calgon Carbon Corporation (Pittsburgh, Pa.), were oven-dried, as received, in air at about 150° C. for about 4 hours, and then cooled in air to ambient temperature, to remove any residual moisture which the carbon may have adsorbed during storage. To determine the inherent catalytic activity of the BCP carbon as received, one of the two portions of oven-dried carbon was calcined under nitrogen for about 30 minutes at about 950° C. and then cooled to ambient temperatures under nitrogen. The t-¾ time of the material resulting from this treatment was then measured by the method described in Example 5. When tested in this manner, the inherent t-¾ time of the carbon measured 11 minutes.

The remaining portion of the oven-dried BCP carbon was deactivated by the method of the present invention in the following manner:

Approximately 15 mL of a 10 N aqueous hydrochloric acid solution was impregnated onto the oven-dried carbon, which was then allowed to stand for about 24 hours in a closed glass container at ambient temperatures. Following this treatment, the container and its contents were directly oven-dried in air at about 150° C. and at atmospheric pressure for about 24 hours, and then cooled to ambient temperature in air. Following this treatment, the oven-dried, hydrochloric acid-treated carbon was calcined under nitrogen for about 30 minutes at about 950° C. and then cooled to ambient temperatures under nitrogen. The t-¾ time of the material resulting from this treatment was then measured by the method described above. When tested in this manner, the inherent t-¾ time of the deactivated carbon measured 198 minutes.

What is claimed is:

1. A process for reducing the inherent catalytic activity of a carbonaceous char, said process comprising
    (a) treating said carbonaceous char with a non-nitrogen-containing non-oxidizing Bronsted acid selected from the group consisting of hydrochloric acid, hydrobromic acid, hydroidic acid and mixtures thereof and
    (b) heating the acid-treated char resulting from step (a) to temperatures greater than or equal to 750° C.

* * * * *